(12) United States Patent
Tokiwa et al.

(10) Patent No.: US 8,264,549 B2
(45) Date of Patent: Sep. 11, 2012

(54) IMAGE STABILIZER FOR OPTICAL INSTRUMENT

(75) Inventors: Kentaro Tokiwa, Miyagi (JP); Junji Hayashi, Miyagi (JP); Akihiro Makimoto, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 364 days.

(21) Appl. No.: 12/647,167

(22) Filed: Dec. 24, 2009

(65) Prior Publication Data

US 2010/0165132 A1 Jul. 1, 2010

(30) Foreign Application Priority Data

Dec. 25, 2008 (JP) ................................. 2008-329218

(51) Int. Cl.
*H04N 5/228* (2006.01)
(52) U.S. Cl. .................. 348/208.11; 348/208.7
(58) Field of Classification Search ............. 348/208.99, 348/208.4, 208.7, 208.11, 373, 374
See application file for complete search history.

(56) References Cited

U.S. PATENT DOCUMENTS

| | | | | |
|---|---|---|---|---|
| 5,214,513 | A * | 5/1993 | Lee | 348/207.99 |
| 6,236,430 | B1 | 5/2001 | Suzuki et al. | |
| 6,967,677 | B1 | 11/2005 | Gfeller | |
| 7,161,621 | B2 | 1/2007 | Kai et al. | |
| 7,327,952 | B2 * | 2/2008 | Enomoto | 396/55 |
| 7,502,554 | B2 * | 3/2009 | Enomoto | 396/55 |
| 7,630,619 | B2 | 12/2009 | Masuda | |
| 8,059,158 | B2 * | 11/2011 | Shirono | 348/208.7 |
| 2002/0163581 | A1 * | 11/2002 | Kitazawa et al. | 348/208.6 |
| 2005/0110873 | A1 | 5/2005 | Enomoto | |
| 2006/0017818 | A1 * | 1/2006 | Enomoto | 348/219.1 |
| 2007/0014555 | A1 * | 1/2007 | Hirunuma et al. | 396/55 |
| 2007/0047935 | A1 | 3/2007 | Awazu et al. | |
| 2007/0297055 | A1 * | 12/2007 | Enomoto et al. | 359/554 |
| 2009/0002502 | A1 * | 1/2009 | Shirono | 348/208.99 |
| 2009/0091832 | A1 * | 4/2009 | Nagai et al. | 359/557 |

FOREIGN PATENT DOCUMENTS

| | | |
|---|---|---|
| DE | 10 2007 005 203 (A1) | 7/2008 |
| JP | 2-66536 | 3/1990 |
| JP | 6-46314 | 2/1994 |
| WO | WO 97/17811 | 5/1997 |

OTHER PUBLICATIONS

European Search Report dated May 3, 2010.
European Search Report dated Jul. 4, 2011.

* cited by examiner

*Primary Examiner* — Nicholas Giles
(74) *Attorney, Agent, or Firm* — McGinn IP Law Group, PLLC

(57) ABSTRACT

An image stabilizer has a base block, a CCD holder, an intermediate member, a rectangular frame-shaped first sheet metal member, a rectangular frame-shaped second sheet metal member, and voice coil motors (VCMs). The first sheet metal member has a pair of mutually-parallel horizontal leaf springs that is formed by bending upper and lower sides of the first sheet metal member. The second sheet metal member has a pair of mutually-parallel vertical leaf springs that is formed by bending right and left sides of the second sheet metal member. The horizontal leaf springs are flexible along a Y-axis, and the vertical leaf springs are flexible along an X-axis in a plane orthogonal to an optical axis. The VCMs shift a CCD through the CCD holder, while bending the horizontal or vertical leaf springs, to counteract a camera shake in an X-axis or Y-axis direction.

2 Claims, 10 Drawing Sheets

IMAGE STABILIZER FOR OPTICAL INSTRUMENT

BACKGROUND OF THE INVENTION

1. Field of the Invention

The present invention relates to an image stabilizer for correcting an image blur due to hand-held shooting.

2. Description Related to the Prior Art

Many optical instruments including digital still cameras have an image stabilizer or a shake correction device for correcting an image blur caused by vibration or a camera shake due to hand-held shooting. The image stabilizer is constituted of a shake detector for detecting the camera shake, a holder for movably holding an optical element such as a taking lens or an image sensor, a computing unit, an actuator for shifting the holder in a plane where the optical element is orthogonal to a photography optical axis, and a position detector for detecting the position of the optical element. The computing unit calculates which direction and how much the optical element should be shifted, based on a detection result of the shake detector such as an angular velocity sensor. The actuator performs feedback control of the shift of the optical element during the camera shake, by using a calculated shift amount as a target value and a present position detected by the position detector as a measurement value.

In the conventional image stabilizers, the holder holds the optical element by guide shafts and bearings in a slidable manner in a direction orthogonal to the photography optical axis. However, wobble and large friction occurring between the guide shaft and the bearing degrades the followability of the holder to the actuator. Accordingly, there is disclosed the type of image stabilizer in which the optical element is held by elastic members disposed along the photography optical axis to reduce the friction during the shift of the optical element (for example, Japanese Patent Laid-Open Publication No. 02-066536, U.S. Pat. No. 7,161,621, and United States Patent Application Publication Nos. 2007/0172220, 2005/0110873 and 2007/0047935). This type of image stabilizer, however, is large in size in the direction of the photography optical axis.

To downsize the image stabilizer in the direction of photography optical axis with reduction in the friction, there are disclosed image stabilizers in which the optical element is held by a single or plurality of leaf springs that is bendable in a plane orthogonal to the photography optical axis. The image stabilizer according to Japanese Patent Laid-Open Publication No. 06-046314 has two pairs of leaf springs for holding an image sensor. The leaf springs of each pair are disposed in parallel with each other. The two pairs of leaf springs are elastically bendable in directions orthogonal to each other. Both ends of each individual leaf spring are attached to fixed or movable pieces.

According to the image stabilizer of U.S. Pat. No. 7,327,952, two pairs of leaf springs are integrally made of plastic or integrated into one body by insert molding. There is also described an embodiment in which the two pairs of leaf springs are integrated by U-shaped metal leaf springs.

According to the image stabilizer of United States Patent Application Publication No. 2007/0297005, a leaf spring strip is bent into a rectangular leaf spring frame. The leaf spring frame is fixed to a lens barrel at two horizontal sides, and holds a circuit board having an image sensor with two vertical sides. On the upper side of the leaf spring frame, a magnet is attached. The magnet and a coil attached to the circuit board constitute a voice coil motor. The voice coil motor deforms the leaf spring frame, and shifts the circuit board in the plane orthogonal to the photography optical axis.

In any of the above image stabilizers using the leaf springs, the leaf springs of each pair have to be disposed in parallel with each other with high precision. If the leaf springs are not in parallel, one leaf spring inhibits elastic bending of the other leaf spring, and interferes with the smooth shift of the optical element. The image stabilizer according to the Japanese Patent Laid-Open Publication No. 06-046314, however, has difficulty in precisely placing the pairs of leaf springs in parallel due to the adverse effects of dimensional accuracy of the fixed and movable pieces and attachment accuracy of the leaf springs.

The plastic leaf springs disclosed in the U.S. Pat. No. 7,327,952 are manufactured by injection molding. Thus, the leaf springs have a limitation in reducing their thicknesses, and cannot easily have appropriate elasticity. In the insert molding, the pair of leaf springs is hard to precisely set in a mold in parallel with each other. Even with the use of the U-shaped leaf spring, the pair of leaf springs is still hard to precisely dispose in parallel with each other, because two parallel sides of the U-shaped leaf spring tend to be open.

In the image stabilizer according to the United States Patent Application Publication No. 2007/0297005, the voice coil motor has to precisely generate a driving force with respect to the center of gravity of the rectangular leaf spring frame, in order to shift the circuit board in the plane orthogonal to the photography optical axis. However, misalignment between the coil and the magnet, deflection of the leaf spring frame or the like causes generation of the driving force in an inappropriate direction, that is, a direction to rotate the circuit board. Application of the driving force in such a direction to the rectangular leaf spring frame results in deformation of the whole leaf spring frame.

SUMMARY OF THE INVENTION

An object of the present invention is to provide an image stabilizer in which a pair of leaf springs for holding an optical element movably in a plane orthogonal to a photography optical axis is disposed in parallel with each other with great precision.

An image stabilizer according to the present invention includes a base block fixed to an optical instrument, an optical element holder for holding an optical element disposed on an optical axis of the optical instrument, an intermediate member disposed outside the optical element holder, a rectangular frame-shaped first sheet metal member fixed to the optical element holder and the intermediate member, a rectangular frame-shaped second sheet metal member fixed to the intermediate member and the base block, and an actuator. The first sheet metal member has a pair of first leaf springs that is formed by bending opposed two sides of the first sheet metal member in parallel with the optical axis and in parallel with each other. The pair of first leaf springs is elastically deformable in a first direction in a plane orthogonal to the optical axis. The second sheet metal member has a pair of second leaf springs that is formed by bending opposed two sides of the second sheet metal member in parallel with the optical axis and in parallel with each other. The pair of second leaf springs is elastically deformable in a second direction transverse to the first direction in the plane orthogonal to the optical axis. The actuator shifts the optical element through the optical element holder, while bending the first leaf springs or the second leaf springs, to counteract a shake in the first direction or the second direction.

It is preferable that remaining two sides of the first sheet metal member constitute first attachment sections, and one of the first attachment sections be fixed to the optical element holder, and the other one of the first attachment sections be fixed to the intermediate member. It is also preferable that remaining two sides of the second sheet metal member constitute second attachment sections, and one of the second attachment sections be fixed to the intermediate member, and the other one of the second attachment sections be fixed to the base block.

It is preferable that the first sheet metal member be disposed so that the pair of first leaf springs sandwiches the optical element holder in a direction orthogonal to the optical axis. It is also preferable that the second sheet metal member be disposed so that the pair of second leaf springs sandwiches the optical element holder, the first sheet metal member, and the intermediate member in a direction orthogonal to the optical axis.

The image stabilizer may further include a shake detector for detecting the shake of the optical instrument, and a position detector for detecting a position of the optical element. The actuator shifts the optical element based on a signal from the shake detector and a position signal from the position detector.

The first sheet metal member, the second sheet metal member, and the intermediate member may be integrally formed into an integrated sheet metal member by bending a single sheet of metal. Furthermore, a reinforcing plate may be attached to the integrated sheet metal member.

It is preferable that the first attachment section have an arm for extending to a rear face of the optical element holder. The arm is provided with a retainer for pressing the optical element from behind against the optical element holder. Between the optical element and the retainer, there may be disposed a heat transfer plate for transferring heat from the optical element to the retainer.

It is preferable that the optical element be an image sensor. It is preferable that the actuator be a voice coil motor that includes a coil and a magnet. It is preferable that the position detector is a Hall element for detecting a magnetic field strength of the magnet and outputting a signal in accordance with a shift amount of the optical element.

Another image stabilizer according to the present invention includes a base block fixed to an optical instrument, an optical element holder for holding an optical element disposed on an optical axis of the optical instrument, an integrated sheet metal member fixed to the optical element holder and the base block, and an actuator. The integrated sheet metal member has a pair of mutually-parallel first leaf springs and a pair of mutually-parallel second leaf springs that are formed by bending a single sheet of metal. The pair of first leaf springs is elastically deformable in a first direction in a plane orthogonal to the optical axis. The pair of second leaf springs is elastically deformable in a second direction in the plane orthogonal to the optical axis. The actuator shifts the optical element through the optical element holder, while bending the first leaf springs or the second leaf springs, to counteract a shake of the optical instrument in the first direction or the second direction.

According to the present invention, the pair of leaf springs can be disposed in parallel with each other with great precision. This allows smooth bending of the leaf springs, and leads to improvement in the accuracy of the image stabilizer. Also, use of the integrated sheet metal member, into which the two pairs of leaf springs are integrated, allows significant reduction in a parts count.

BRIEF DESCRIPTION OF THE DRAWINGS

For more complete understanding of the present invention, and the advantage thereof, reference is now made to the following descriptions taken in conjunction with the accompanying drawings, in which.

DESCRIPTION OF THE PREFERRED EMBODIMENTS

First Embodiment

Figure 1:
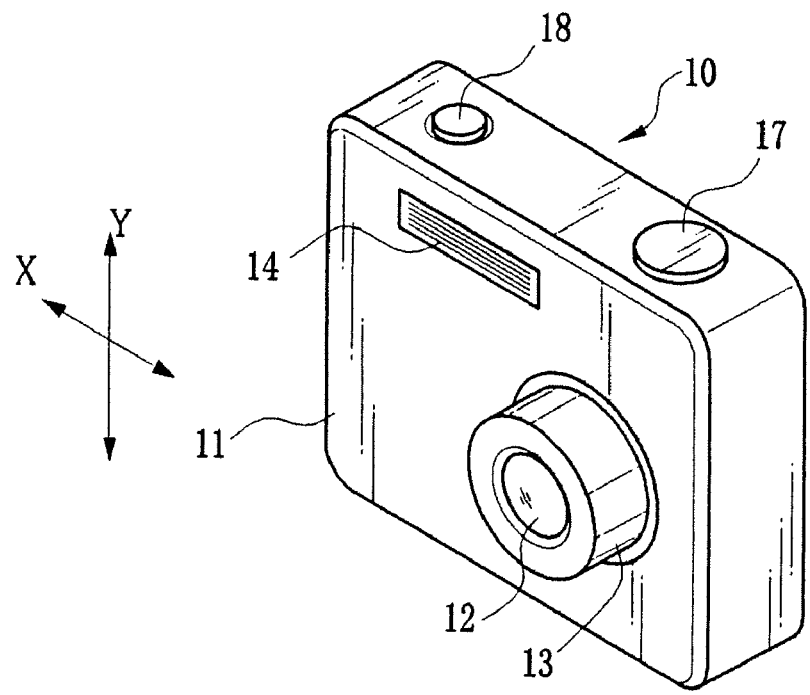
FIG. 1 is a front perspective view of a digital still camera.

As shown in FIG. 1, a digital still camera 10 has a lens barrel 13 for containing an optical system 12, a flashlight emitter 14 for applying flashlight to an object and the like in a front face of a camera body 11.

On a top face of the camera body 11, there are provided operating members including an operation dial 17 and a shutter button 18. The operation dial 17 is used for turning the power on and off, and switching an operation mode (among a photographing mode, a playback mode and the like). The shutter button 18 is a two-step push switch, and used for taking an image. Upon turning on a first-step switch SW1 by a half press of the shutter button 18, the digital still camera 10 makes preparation for image taking (exposure setting and focusing). After that, when a second-step switch SW2 is turned on by a full press of the shutter button 18, the digital still camera 10 captures a still image and stores image data on a memory card 26.

Figure 2:
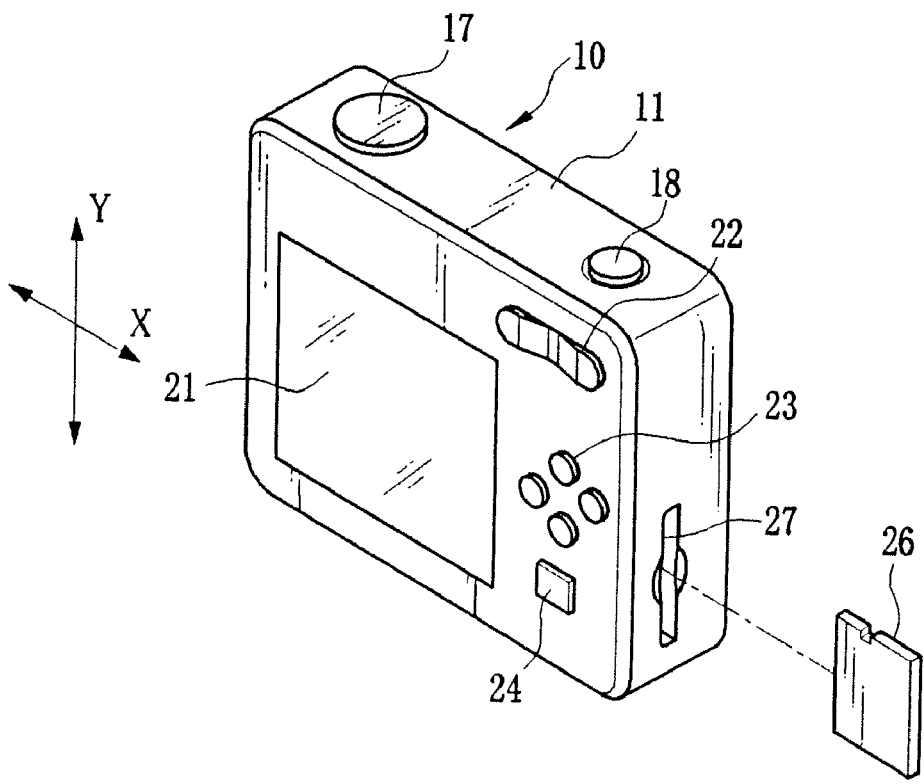
FIG. 2 is a rear perspective view of the digital still camera.

As shown in FIG. 2, a liquid crystal display (LCD) 21, a zoom button 22, a set of cursor keys 23, and a confirmation button 24 are provided on a rear face of the camera body 11. On the LCD 21, a live image, a playback image, a setting menu screen or the like is displayed in response to the chosen operation mode. The zoom button 22 is used for optically or digitally varying zoom magnification. The cursor keys 23 are used for changing settings, or choosing an item from the setting menu screen on the LCD 21. The confirmation button 24 enters the item chosen by the cursor keys 23.

In a side face of the camera body 11, a memory card slot 27 is provided. The memory card 26 is detachably inserted into the memory card slot 27.

Figure 3:
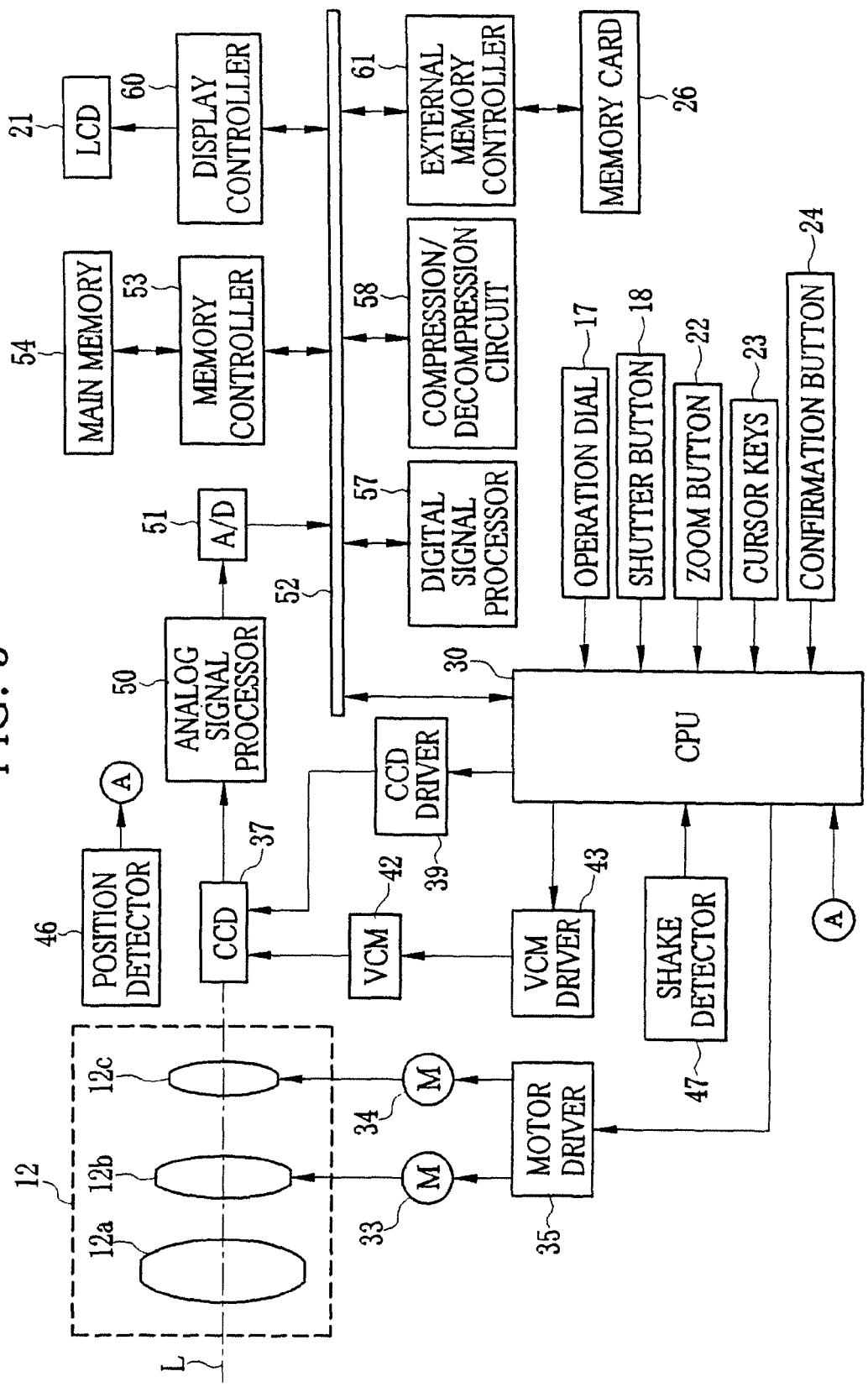
FIG. 3 is a circuit block diagram of the digital still camera.

In FIG. 3, a CPU 30 controls the entire operation of the digital still camera 10. To be more specific, the CPU 30 powers on or off the digital still camera 10, or changes the operation mode thereof in response to rotation of the operation dial 17. The CPU 30 carries out various types of operation in response to a press of the shutter button 18, the cursor keys 23 and the confirmation button 24.

The optical system 12 has a fixed lens group 12a, a zoom lens group 12b, and a focus lens group 12c. The fixed lens group 12a is disposed at the forefront of the lens barrel 13. The zoom lens group 12b and the focus lens group 12c are movably disposed along a photography optical axis "L" of the optical system 12. The zoom lens group 12b is driven by a stepping motor 33, and the focus lens group 12c is driven by a stepping motor 34. The CPU 30 controls the positions of the zoom lens group 12b and the focus lens group 12c via a motor driver 35 (zooming and focusing). Each lens group has a single or plurality of lens elements.

Behind the optical system 12, there is disposed a CCD 37 that rests in a standard position where the center of its imaging surface coincides with the photography optical axis "L", while a camera shake does not occur. The CPU 30 controls actuation of the CCD 37 via a CCD driver 39. The CCD 37 converts an object image formed by the optical system 12 into an electrical pickup signal. Instead of the CCD 37, a CMOS image sensor or the like may be used.

The CCD 37 is supported by a CCD support mechanism 64, which will be described later on, movably in a plane orthogonal to the photography optical axis "L" in response to the camera shake. The CCD support mechanism 64 has first and second voice coil motors (VCMs) 42. When an X-axis direction (yaw direction) refers to a horizontal direction of the digital still camera 10, and a Y-axis direction (pitch direction) refers to a vertical direction thereof, the first VCM 42 shifts the CCD 37 in the X-axis direction, and the second VCM 42 shifts the CCD 37 in the Y-axis direction. The CPU 30 controls the VCMs 42 via VCM drivers 43.

The CCD support mechanism 64 is provided with a position detector 46 for detecting the position of the CCD 37. Position data of the CCD 37 outputted from the position detector 46 is inputted to the CPU 30. A shake detector 47 has two angular velocity sensors for detecting the X-axis and Y-axis camera shakes applied to the digital still camera 10. Shake data from the shake detector 47 is inputted to the CPU 30. Instead of the angular velocity sensors, accelerometers may be used as the shake detector 47.

The CCD support mechanism 64, the VCMs 42, the position detector 46 and the shake detector 47 compose an image stabilizer. In a shake correction mode, the CPU 30 performs feedback control of the VCMs 42 based on the shake data from the shake detector 47 and the position data from the position detector 46, and shifts the position of the CCD 37 in response to the camera shake for the purpose of suppressing a blur in the object image that is incident on the imaging surface of the CCD 37. Instead of the CPU 30 performing the feedback control by software, the VCM drivers 43 may be provided with differential amplifiers for the feedback control.

The pickup signal from the CCD 37 is inputted to an analog signal processor 50, and subjected to analog signal processing including gain correction, correlated double sampling and the like. The pickup signal outputted from the analog signal processor 50 is inputted to an A/D converter 51, and converted into a digital signal. The digital pickup signal from the A/D converter 51 is transmitted through a bus 52, and written to a main memory 54 as the image data by a memory controller 53.

The memory controller 53 reads out the image data from the main memory 54 based on a command from the CPU 30 connected to the bus 52. In addition to the A/D converter 51, the memory controller 53 and the CPU 30, a digital signal processor 57, a compression/decompression circuit 58, an external memory controller 61 and a display controller 60 are connected to the bus 52.

The digital signal processor 57 applies predetermined image processing such as YC conversion, gamma correction, contour correction and white balance correction to the image data read from the main memory 54. The compression/decompression circuit 58 applies predetermined compression processing such as JPEG compression to the image data outputted from the digital signal processor 57. The external memory controller 61 writes/reads the image data to/from the memory card 26 loaded in the memory card slot 27. The display controller 60 displays the image data, the setting menu screen or the like on the LCD 21.

In a still image photographing mode, a field image (moving image) is readout from the CCD 37 at a predetermined readout rate, and temporarily written to the main memory 54 as image data. The image data in the main memory 54 is subjected to the image processing by the digital signal processor 57, and sent to the display controller 60. Accordingly, a live image or a through image taken by the CCD 37 is displayed on the LCD 21.

After framing a picture while seeing the through image on the LCD 21, the shutter button 18 is half pressed. In response to the half press, an exposure amount (shutter speed and aperture stop value) is determined and focusing of the optical system 12 is automatically obtained. If the shutter button 18 is fully pressed, a still image is taken under the exposure amount. In this still image photography, a frame image is read from the CCD 37, and written to the main memory 54. The image data stored on the main memory 54 is subjected to the image processing by the digital signal processor 57 and to the compression processing by the compression/decompression circuit 58. The image data of the still image after the compression processing is written to the memory card 26 by the external memory controller 61. After taking the still image, another through image is displayed on the LCD 21 as a preparation for taking the next still image.

If the digital still camera 10 is put into the playback mode, the image data is read out from the memory card 26, and subjected to decompression processing by the compression/decompression circuit 58. The decompressed image data is sent to the display controller 60, so that the playback still image is displayed on the LCD 21. Operation of frame advance buttons forward or backward changes the still image displayed on the LCD 21 frame-by-frame. By zooming operation, a part of the still image is displayed under magnification. If the digital still camera 10 is put into a moving image photographing mode, a moving image is taken for a lapse of predetermined time in response to the operation of the shutter button 18, and moving image data is stored on the memory card 26.

Figure 4:
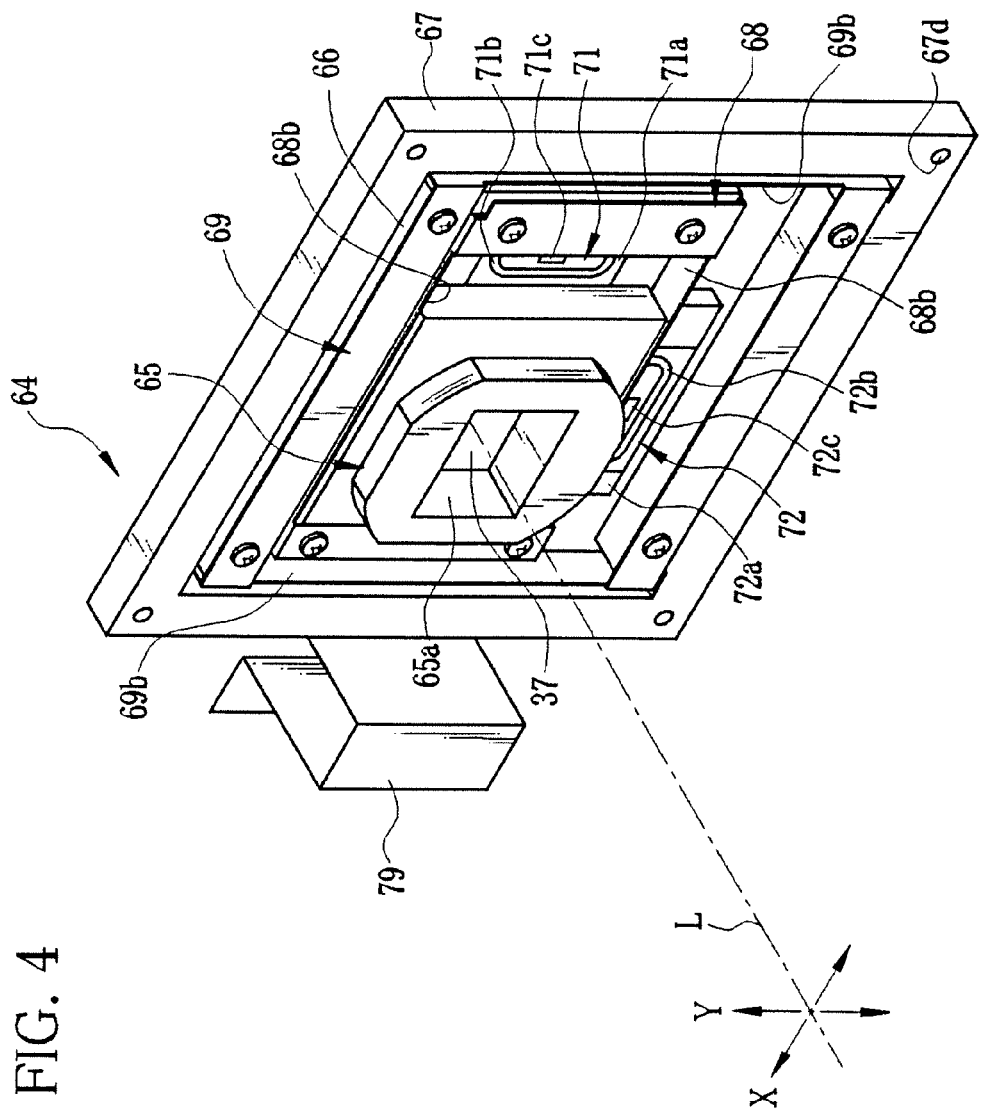
FIG. 4 is a front perspective view of a CCD support mechanism according to a first embodiment.
Figure 6:
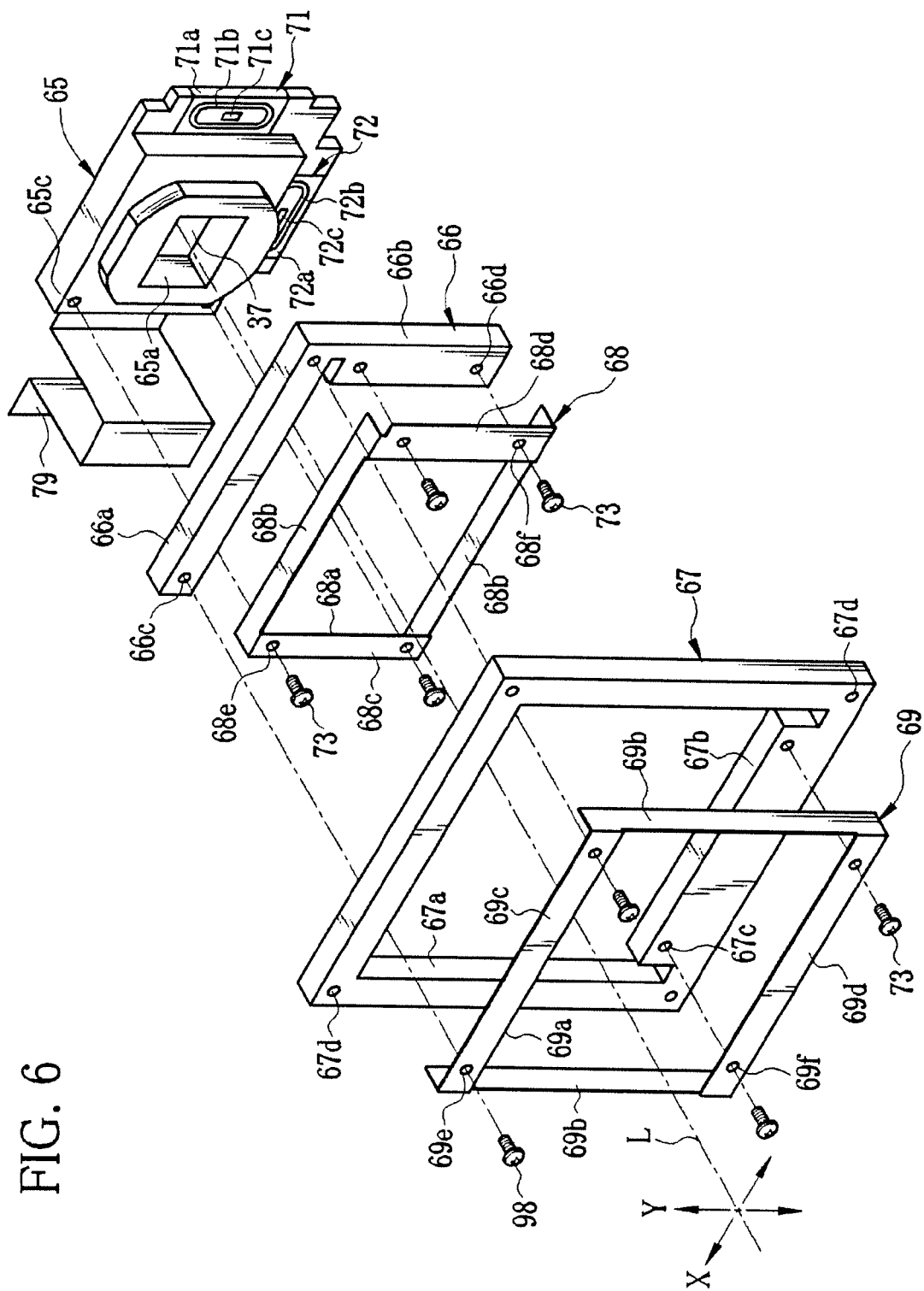
FIG. 6 is an exploded front perspective view of the CCD support mechanism.

As shown in FIGS. 4 and 6, the CCD support mechanism 64 is constituted of a CCD holder 65, an intermediate member 66, a base block 67, a first sheet metal member 68, a second sheet metal member 69, and a CCD retaining plate 70. A first coil unit 71 is attached to a side face of the CCD holder 65, and a second coil unit 72 is attached to a bottom face thereof.

The CCD holder 65 holds the CCD 37, and is movable in the plane orthogonal to the photography optical axis "L". The CCD holder 65 is made of plastic into a plate shape, and has a rectangular exposure opening 65a in its front face. In a rear face of the CCD holder 65, a hollow section 65b is formed so as to be coupled to the exposure opening 65a. The CCD 37 is fitted into the hollow section 65b. In a front face of the CCD holder 65, a pair of screw holes 65c is vertically aligned at an end on a positive X-axis side.

The intermediate member 66 is made of plastic into the shape of the letter L. The intermediate member 66 has a horizontal section 66a extending in the X-axis direction and an erected section 66b extending downward (in a negative Y-axis direction) from the horizontal section 66a. A pair of screw holes 66c is provided in a front face of the horizontal section 66a, and a pair of screw holes 66d is provided in a front face of the erected section 66b.

The rectangular frame-shaped base block 67 has an opening 67a, into which the second sheet metal member 69 is fitted. On a top face of a lower side of the base block 67, there is a sheet metal member attachment section 67b that is projected into the opening 67a. The sheet metal member attachment section 67b has a width corresponding to the width of a base block attachment section 69d of the second sheet metal member 69, and has a pair of screw holes 67c in its front face. At the four corners of the base block 67, attachment holes 67b are formed for attachment of the base block 67 to a lens barrel.

The first sheet metal member 68 has an opening 68a into which the CCD holder 65 is fitted, a pair of horizontal leaf springs 68b disposed over and under the opening 68a along the X-axis, and a CCD holder attachment section 68c and an intermediate member attachment section 68d extending from both ends of the horizontal leaf springs 68b along the Y-axis. In the CCD holder attachment section 68c, a pair of attachment holes 68e is formed in positions corresponding to the screw holes 65c. In the intermediate member attachment section 68d, a pair of attachment holes 68f is formed in positions corresponding to the screw holes 66d.

In forming the first sheet metal member 68, upper and lower sides of a rectangular metal leaf spring frame are bent at a right angle, so that the pair of horizontal leaf springs 68b is integrally formed in parallel with each other. Not-bent left and right sides are used as the CCD holder attachment section 68c and the intermediate member attachment section 68d, respectively.

While a second printed coil 72b is energized to shift the CCD holder 65 in the Y-axis direction, the pair of horizontal leaf springs 68b is elastically bent in the Y-axis direction in the plane orthogonal to the photography optical axis "L". The horizontal leaf springs 68b are machined with high precision so that an amount of deflection in the direction of the photography optical axis "L" is of the order of micrometers.

The second sheet metal member 69 has an opening 69a into which the intermediate member 66 is fitted, a pair of vertical leaf springs 69b disposed on both sides of the opening 69a along the Y-axis, and an intermediate member attachment section 69c and the base block attachment section 69d extending over and under the opening 69a along the X-axis. In the intermediate member attachment section 69c, a pair of attachment holes 69e is formed in positions corresponding to the screw holes 66c. In the base block attachment section 69d, a pair of attachment holes 69f is formed in positions corresponding to the screw holes 67c.

In forming the second sheet metal member 69, right and left sides of a rectangular metal leaf spring frame are bent at a right angle, so that the pair of vertical leaf springs 69b is integrally formed in parallel with each other. Not-bent upper and lower sides are used as the intermediate member attachment section 69c and the base block attachment section 69d, respectively.

While a first printed coil 71b is energized to shift the intermediate member 66 in the X-axis direction, the pair of vertical leaf springs 69b is elastically bent in the X-axis direction in the plane orthogonal to the photography optical axis "L". The vertical leaf springs 69b are machined with high precision so that an amount of deflection in the direction of the photography optical axis "L" is of the order of micrometers.

The CCD holder 65, the intermediate member 66, the base block 67, the first sheet metal member 68, and the second sheet metal member 69 are assembled into the CCD support mechanism 64 by fastening with screws 73 through the attachment holes 68e, 68f, 69e, and 69f. The pair of horizontal leaf springs 68b is integrated into the first sheet metal member 68, and the pair of vertical leaf spring sections 69b is integrated into the second sheet metal member 69. Accordingly, it is possible to attach the first sheet metal member 68 and the second sheet metal member 69 to the CCD holder 65, the intermediate member 66, and the base block 67 with maintaining the parallelism between the pair of horizontal leaf springs 68b and between the pair of vertical leaf springs 69b.

Figure 7A:
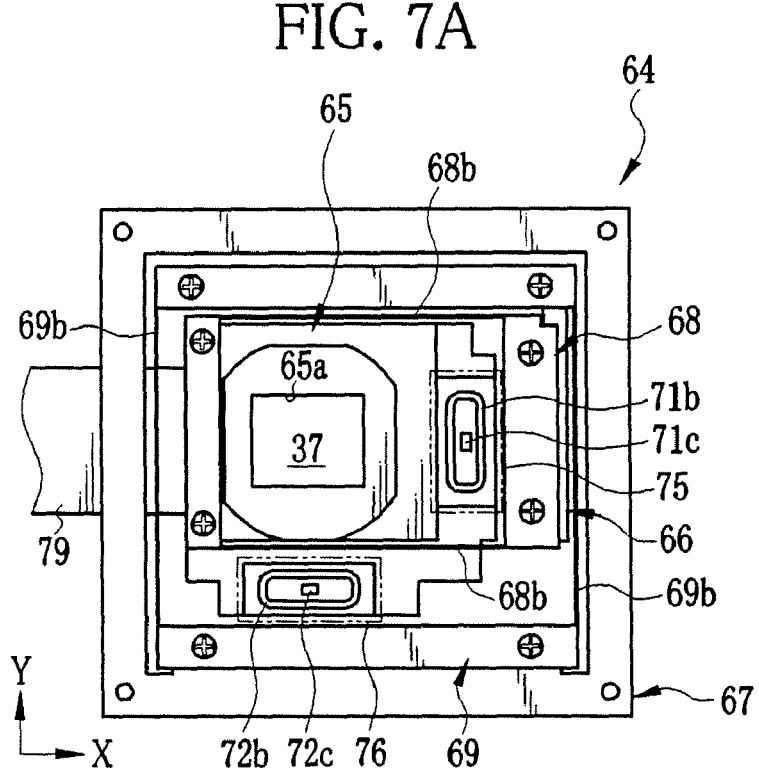
FIG. 7A is a front view of the CCD support mechanism before a camera shake.

The first coil unit 71 has a first attachment board 71a attached to a side face of the CCD holder 65, an approximately loop-shaped first printed coil 71b attached to a front face of the first attachment board 71a, and a first Hall element 71c disposed at the center of the first printed coil 71b. In a like manner, the second coil unit 72 has a second attachment board 72a attached to a bottom face of the CCD holder 65, an approximately loop-shaped second printed coil 72b attached to a front face of the second attachment board 72a, and a second Hall element 72c disposed at the center of the second printed coil 72b. As shown in FIG. 7A, a first stationary magnet 75 is disposed so as to face the first printed coil 71b. A second stationary magnet 76 is disposed so as to face the second printed coil 72b. The first printed coil 71b and the first stationary magnet 75 constitute the X-axis VCM 42 for shifting the CCD 37 in the X-axis direction. The second printed coil 72b and the second stationary magnet 76 constitute the Y-axis VCM 42 for shifting the CCD 37 in the Y-axis direction.

The X-axis and Y-axis VCMs 42 are well-known voice coil motors of flat-coil type. The stationary magnet 75 generates a magnetic field around the first printed coil 71b, and the second stationary magnet 76 generates a magnetic field around the second printed coil 72b. When the X-axis VCM driver 43 feeds an electric current through the first printed coil 71b in the magnetic field of the stationary magnet 75, a Lorentz force is generated in the X-axis direction. When the Y-axis VCM driver 43 feeds an electric current through the second printed coil 72b in the magnetic field of the second stationary magnet 76, in a like manner, a Lorentz force is generated in the Y-axis direction. The directions of the Lorentz forces depend on the directions of the electric current flowing through the first and second printed coils 71b and 72b, and the magnitude of the Lorentz forces depends on current values.

The Lorentz force generated in the second printed coil 72b shifts the CCD holder 65 in the Y-axis direction, while bending the horizontal leaf springs 68b. In a like manner, the Lorentz force generated in the first printed coil 71b shifts the intermediate member 66 and the CCD holder 65 in the X-axis direction, while bending the vertical leaf springs 69b.

Figure 7B:
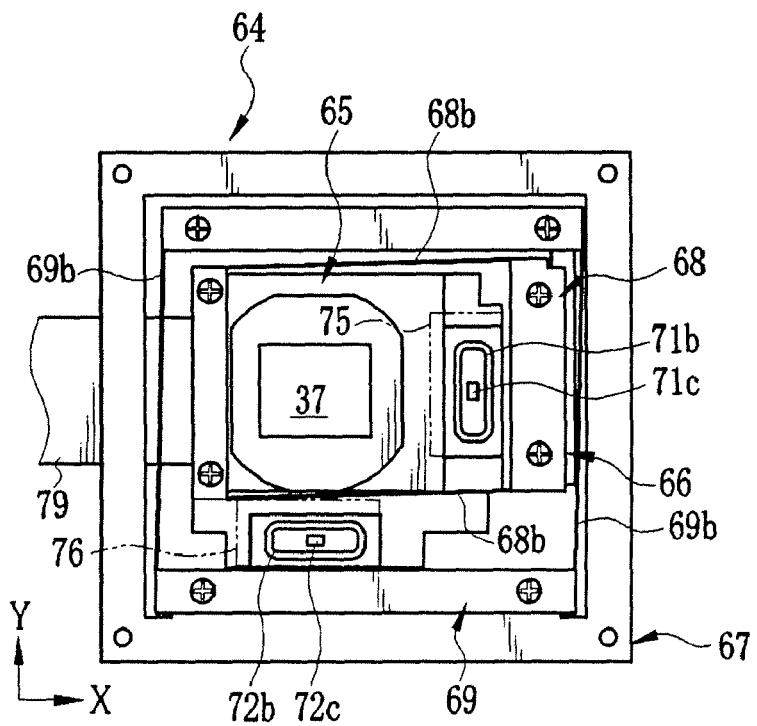
FIG. 7B is a front view of the CCD support mechanism after the camera shake.

The first Hall element 71c, the second Hall element 72c, the first stationary magnet 75, and the second stationary magnet 76 constitute the position detector 46. The first Hall element 71c detects the magnetic field strength of the first stationary magnet 75, and outputs a detection signal. The second Hall element 72c detects the magnetic field strength of the second stationary magnet 76, and outputs a detection signal. As shown in FIG. 7B, when the CCD holder 65 shifts in the Y-axis direction to counteract the camera shake, the magnetic field strength of the second stationary magnet 76 varies. The second Hall element 72c detects the position of the CCD 37 in the Y-axis direction from a variation in the magnetic field strength. In a like manner, when the intermediate member 66 shifts in the X-axis direction, the magnetic field strength of the first stationary magnet 75 varies. The first Hall element 71c detects the position of the CCD 37 in the X-axis direction from a variation in the magnetic field strength.

Figure 5:
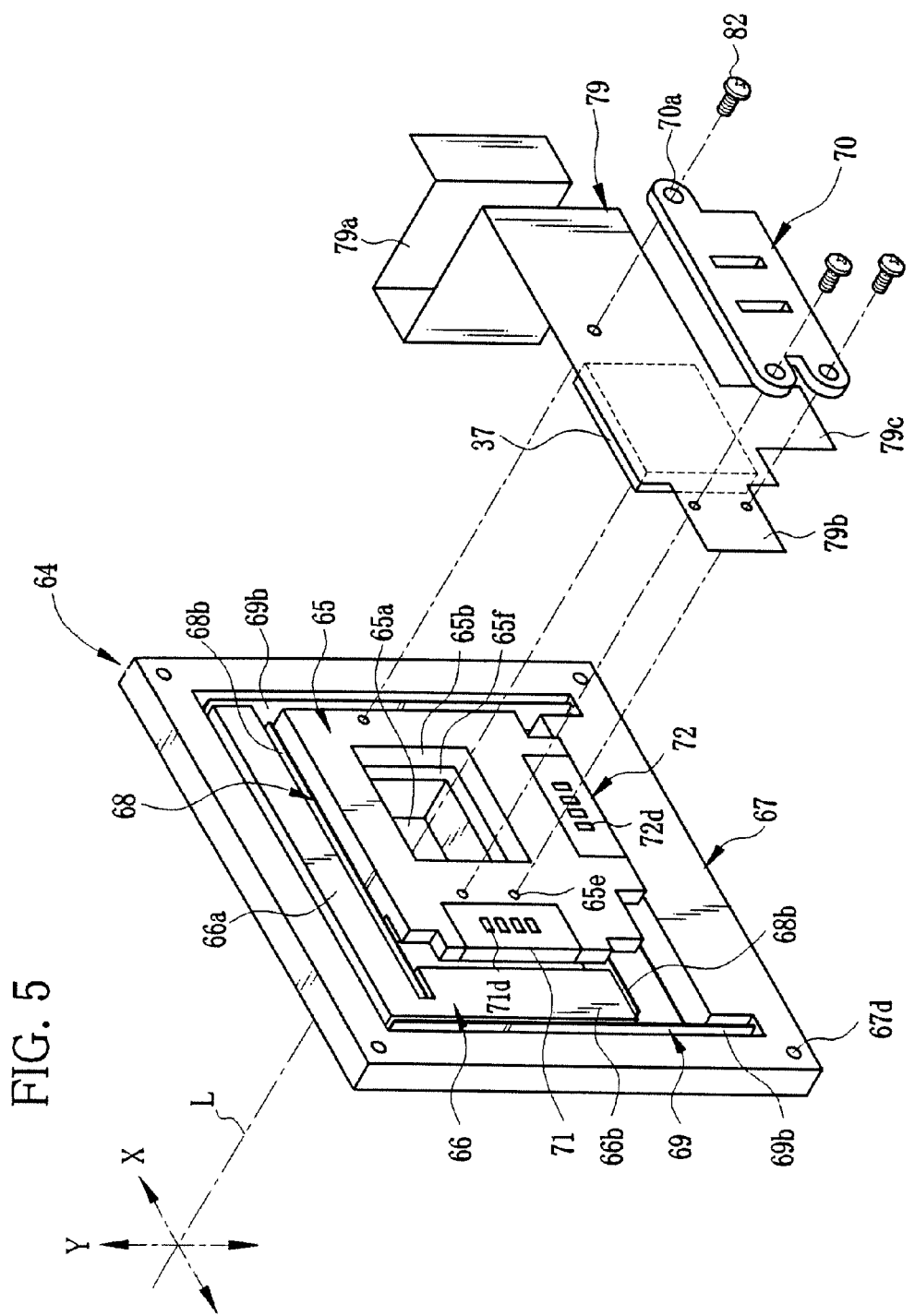
FIG. 5 is a rear perspective view of the CCD support mechanism.

As shown in FIG. 5, the CCD 37 is fitted into the hollow section 65b from the side of the imaging surface. To a rear face of the CCD 37, there is attached a flexible printed circuit (FPC) 79 for electrically connecting the CCD 37 to a main circuit board having the CPU 30, the CCD driver 39, the VCM drivers 43 and the like. The FPC 79 has a flexion 79a that has a plurality of flexed portions to facilitate the smooth shift of the CCD holder 65.

The FPC 79 includes integrally formed connection segments 79b and 79c. The connection segment 79b is electrically connected to terminals 71d provided on a rear face of the first coil unit 71, to allow connection to the first coil unit 71. The connection segment 79c is electrically connected to terminals 72d provided on a rear face of the second coil unit 72, to allow connection to the second coil unit 72. As a result, the first printed coil 71b, the second printed coil 72b, the first Hall element 71c, and the second Hall element 72c are electrically connected to the VCM drivers 43 and the CPU 30 on the main circuit board.

The CCD retaining plate 70 is fastened to the CCD holder 65 with screws 82 through three holes 70a formed on the corners of the CCD retaining plate 70 and the screw holes 65e of the CCD holder 65. The CCD retaining plate 70 presses the front face of the CCD 37 from behind through the FPC 79 against a positioning surface 65f in the hollow section 65b.

Figure 8:
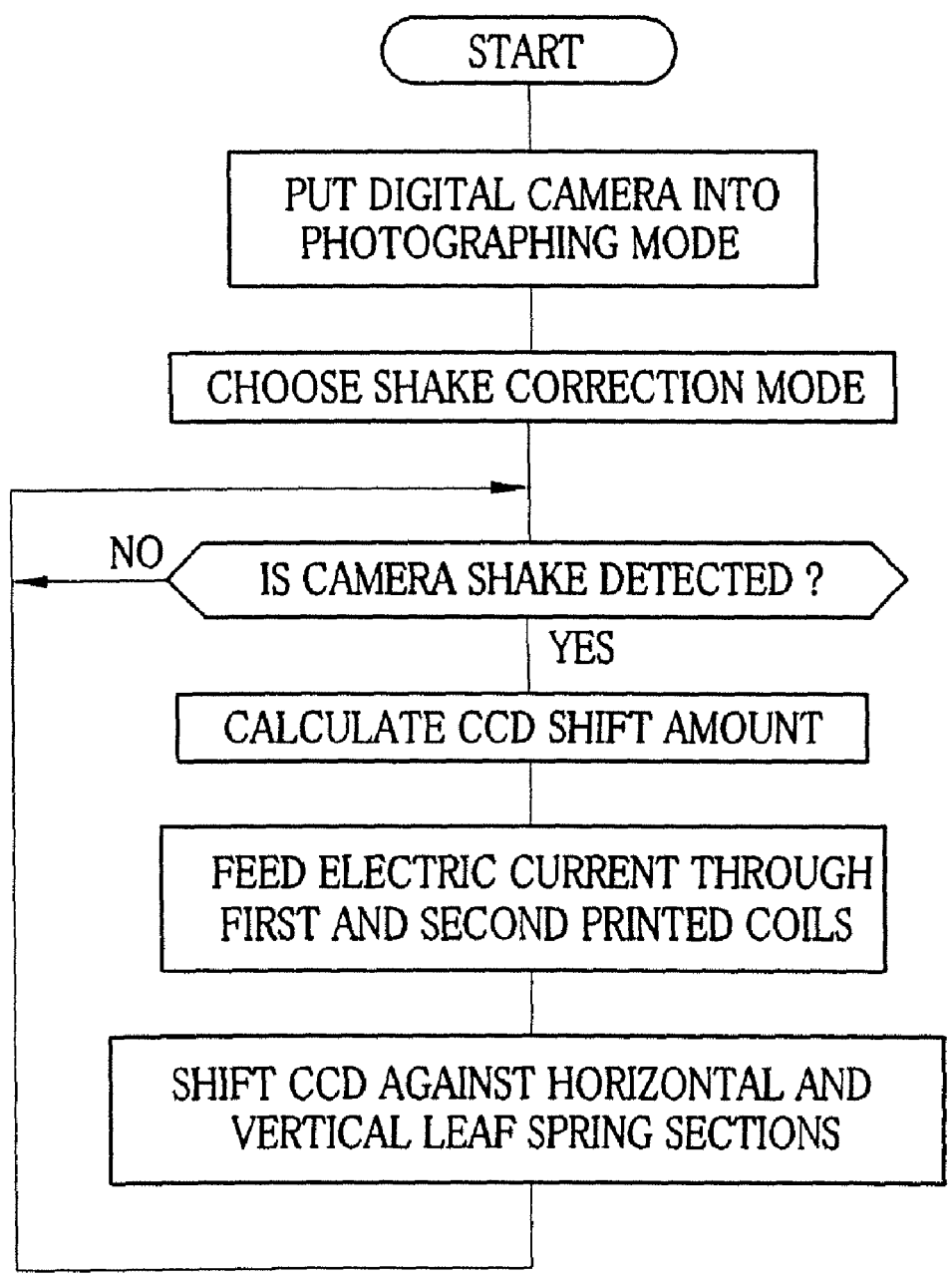
FIG. 8 is a flowchart of a shake correction mode of the digital still camera.

Referring to FIG. 8, the operation of the foregoing embodiment will be described. To take a still image, the digital still camera 10 is put into the photographing mode by operation of the operation dial 17. To prevent an image blur by hand-held shooting, the shake correction mode is also chosen.

While the camera shake does not occur, the horizontal leaf springs 68 and the vertical leaf springs 69 are straight as shown in FIG. 7A. In this case, the CCD 37 held by the CCD holder 65 is maintained in the standard position where the center of the CCD 37 is aligned with the photography optical axis "L".

Upon occurrence of the camera shake, the shake detector 47 attached to the lens barrel 13 or the camera body 11 is quickly actuated. The shake detector 47 outputs detection signals (X-axis angular velocity and Y-axis angular velocity) that represent magnitude of the camera shake in the X-axis (yaw) and Y-axis (pitch) directions, and sends the detection signals to the CPU 30. The CPU 30 calculates target shift amounts of the CCD in each of the X-axis and Y-axis directions, based on integration values of individual angular velocities. These target shift amounts are sent to the VCM drivers 43.

The X-axis VCM driver 43 has an X-axis differential amplifier, and the Y-axis VCM driver 43 has a Y-axis differential amplifier. Each differential amplifier performs feedback control of the position of the CCD 37, by using the target shift amount as a target value and a present position as a measurement value. The X-axis present position is detected by the first Hall element 71c, and the Y-axis present position is detected by the second Hall element 72c.

In response to occurrence of the camera shake, the target shift amounts are calculated in accordance with the X-axis and Y-axis angular velocities. Since the CCD 37 is in the standard position at this point, the VCM drivers 43 feed large amounts of electric currents through the printed coils 71b and 72b at the beginning of the camera shake, to generate large Lorentz forces between the first printed coil 71b and the first stationary magnet 75 and between the second printed coil 72b and the second stationary magnet 76. The Lorentz forces, as shown in FIG. 7B, lead to shift the CCD holder 65 in the opposite direction of the camera shake, while elastically bending the horizontal leaf springs 68 and the vertical leaf springs 69. The shift of the CCD holder 65 brings a change in the present position of the CCD 37. Thus, the difference between the target shift amount and the present position becomes smaller, and the electric currents flowing through the printed coils 71b and 72b are reduced. The shift of the CCD holder 65 counteracts a shift of an image formed on the CCD 37 due to the camera shake, and hence a sharp still image without a blur is captured.

When the horizontal leaf springs 68 are bent in the Y-axis direction, the CCD holder 65 is slightly shifted in the X-axis direction too, but the X-axis shift amount is of the order of micrometers. Accordingly, there is no harm in energizing only the second printed coil 72b in response to the Y-axis camera shake. Likewise, when the vertical leaf springs 69 are bent in the X-axis direction, the intermediate member 66 is slightly shifted in the Y-axis direction too, but the Y-axis shift amount is negligible. Accordingly, in response to the X-axis camera shake, only the first printed coil 71b is energized to correct the image blur.

Upon stopping the camera shake, the target shift amount becomes "0", and hence the VCM drivers 43 feed electric currents of opposite directions through the printed coils 71b and 72b to return the CCD 37 to the standard position. At this time, the elasticity of the horizontal leaf springs 68 and the vertical leaf springs 69 contribute to the CCD return. When the CCD 37 has returned to the standard position, the target shift amounts and the present position become "0", and thus the VON drivers 43 stop energizing the printed coils 71b and 72b. Then, the CCD 37 is maintained in the standard position by the horizontal leaf springs 68 and the vertical leaf springs 69.

The camera shake tends to occur during a press of the release button 18 in a state of holding the digital still camera 10 with hands. The image stabilizer shifts the CCD 37 while detecting the camera shake so as not to move the image on the CCD 37, and allows capturing the sharp still image without the image blur.

In the CCD support mechanism 64 according to the present invention, since the CCD 37 is held by only the pairs of horizontal leaf springs 68 and vertical leaf springs 69, there is no problem of friction or wobble during the shift of the CCD 37. Thus, it is possible to provide the image stabilizer with high followability to the VCMs 42. The pairs of horizontal leaf springs 68 and vertical leaf springs 69 that are flexible in the plane orthogonal to the photography optical axis "L" obviate the need for a slider and guide shafts, and hence contribute reduction in the thickness of the digital still camera 10 in the direction of the photography optical axis "L". Furthermore, the pair of horizontal leaf springs 68b is integrated into the first sheet metal member 68, and the pair of vertical leaf springs 69b is integrated into the second sheet metal member 69. This allows high parallelism between each individual pair of leaf springs, and hence increases accuracy of image stabilization. A decrease in a parts count results in cost reduction.

Second Embodiment

In a second embodiment, the first sheet metal member and the second sheet metal member are integrally formed into one body by bending a single sheet of metal, for the purpose of further improving orthogonality between the horizontal leaf springs and the vertical leaf springs and facilitating assembly. The same reference numbers as the first embodiment indicate substantially the same elements or parts, and description thereof will be omitted.

Figure 9:
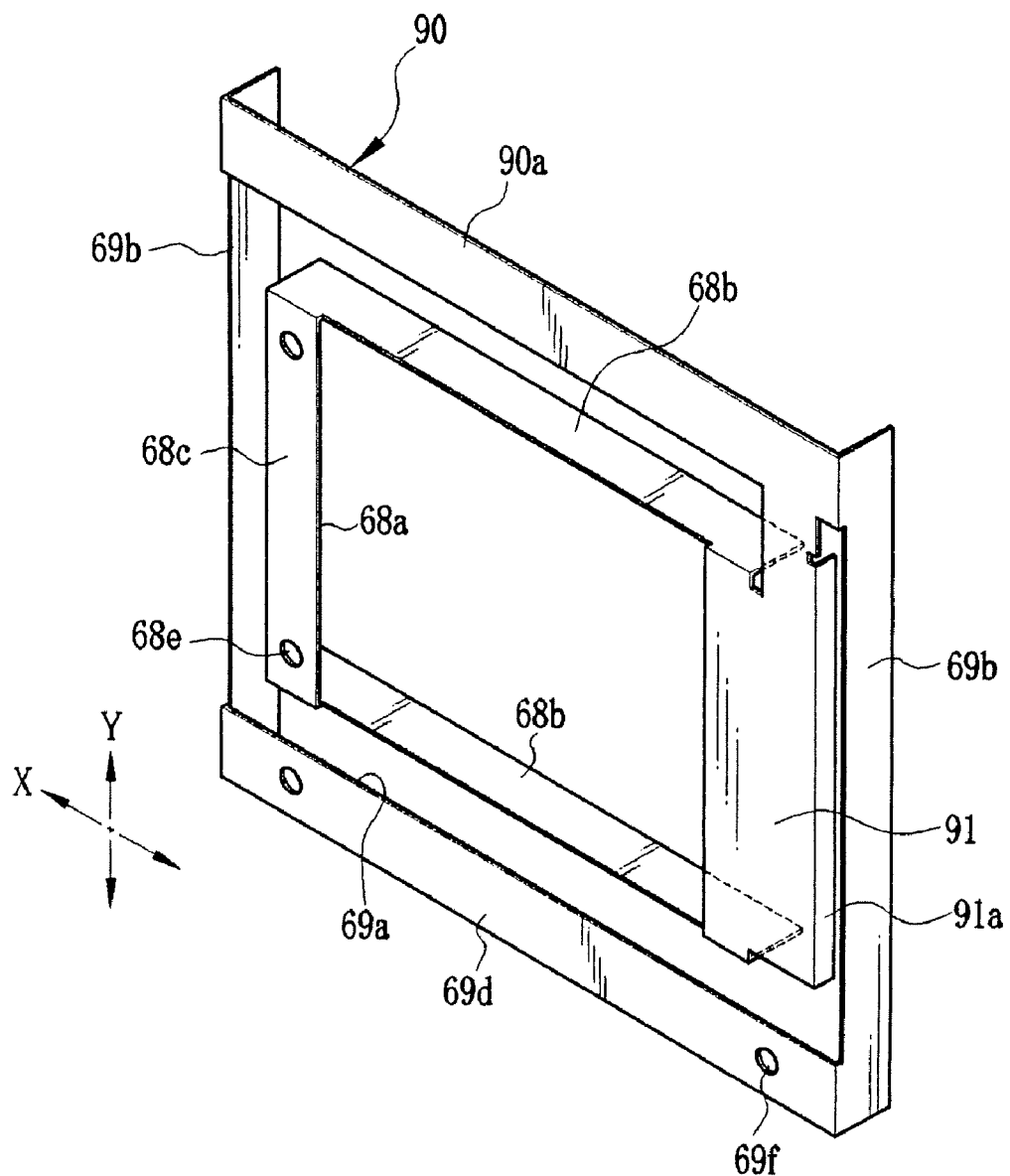
FIG. 9 is a front perspective view of an integrated sheet metal member according to a second embodiment.

In an integrated sheet metal member 90 made of a metal leaf spring material, as shown in FIG. 9, a coupling section 91 corresponding to the intermediate member 66 couples the first sheet metal member 68 and the second sheet metal member 69 according to the first embodiment. The integrated sheet metal member 90 has a pair of horizontal leaf springs 68b extending in the X-axis direction and a pair of vertical leaf springs 69b extending in the Y-axis direction.

The integrated sheet metal member 90 is used instead of the intermediate member 66, the first sheet metal member 68, and the second sheet metal member 69 of the CCD support mechanism 64 according to the first embodiment. In the integrated sheet metal member 90, the pair of horizontal leaf springs 68b and the pair of vertical leaf springs 69b are formed orthogonally to each other from the single sheet of metal with high precision. The second embodiment allows elimination of the intermediate member 66, and results in cost reduction. A vertical edge 91a of the coupling section 91 is bent at a right angle for reinforcement, and the weight of the CCD holder 65 and the like does not cause deformation of the coupling section 91.

Figure 10:
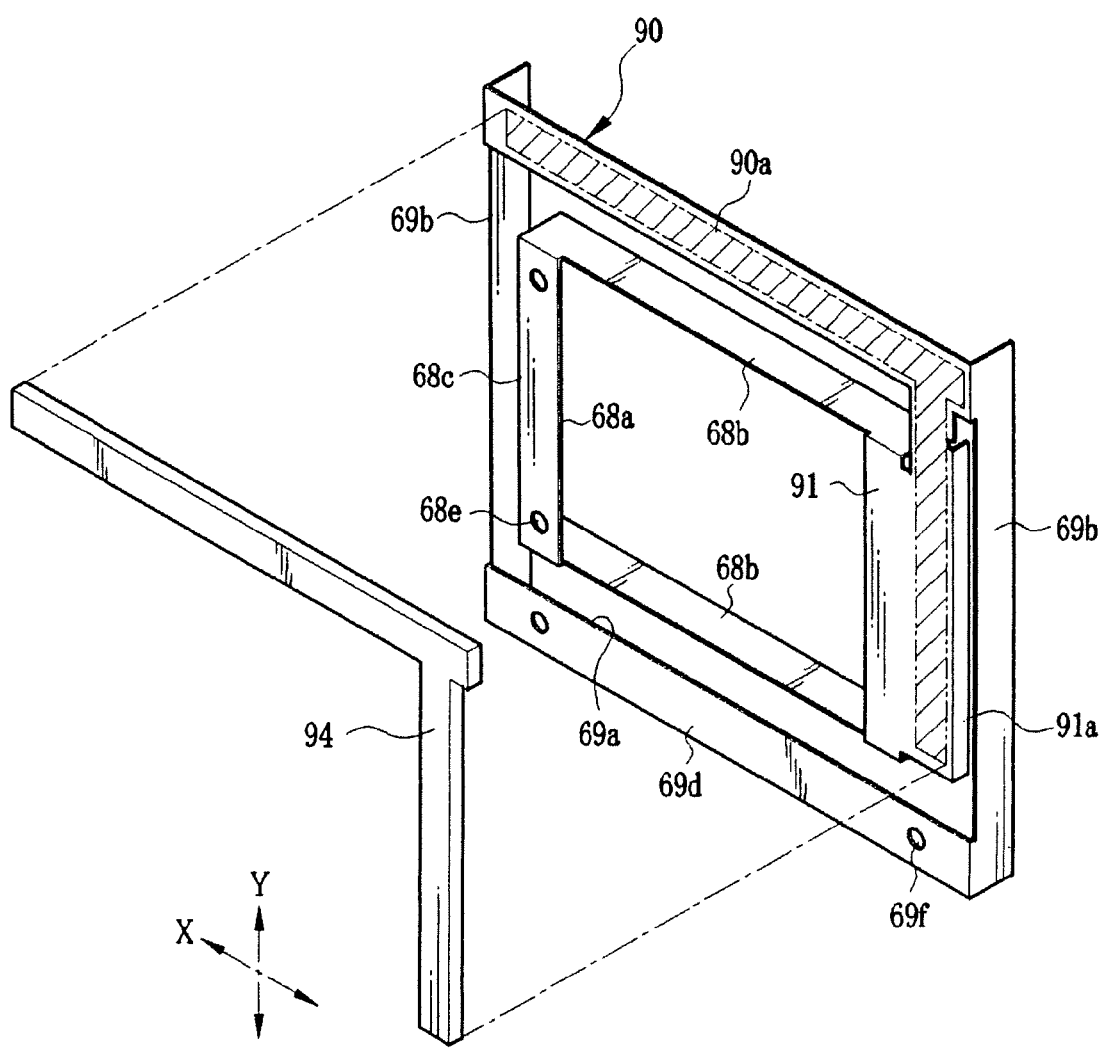
FIG. 10 is a front perspective view of the integrated sheet metal member with a reinforcing plate.

Depending on the thickness of the sheet metal member, there is a case where bending the vertical edge 91a cannot ensure sufficient strength of the coupling section 91. In such a case, as shown in FIG. 10, an approximately L-shaped reinforcing plate 94 may be glued on a diagonally shaded area of an upper side 90a and the coupling section 91 of the integrated sheet metal member 90.

Third Embodiment

In the foregoing embodiments, the CCD is attached to the CCD holder by use of the CCD retaining plate. However, the first sheet metal member 68 according to the first embodiment or the integrated sheet metal member 90 according to the second embodiment may have the function of the CCD retaining plate, to obviate the CCD retaining plate. The following third embodiment describes a case where the first sheet metal member 68 has the function of the CCD retaining plate. The same reference numbers as the first and second embodiments indicate substantially the same elements or parts, and description thereof will be omitted.

Figure 11:
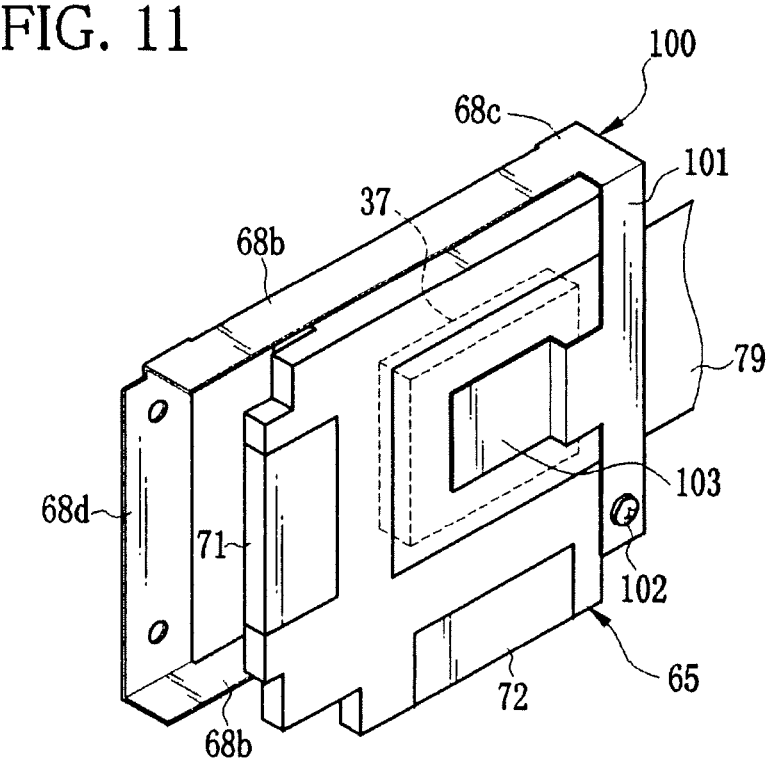
FIG. 11 is a rear perspective view of a first sheet metal member having a retainer according to a third embodiment.

A first sheet metal member 100, as shown in FIG. 11, integrally has an arm 101 that extends on a rear side from an upper end of the CCD holder attachment section 68c in a downward direction. The arm 101 is bent behind the CCD holder 65, and fixed to the CCD holder 65 at an end with a screw 102. In the middle of the arm 101, a retainer 103 is projected so as to cross a longitudinal direction of the arm 101. The retainer 103 presses the rear face of the CCD 37 from behind through the FPC 79, and fixes the position of the CCD 37 in the CCD holder 65. According to the present embodiment, elimination of the CCD retaining plate results in cost reduction.

Figure 12:
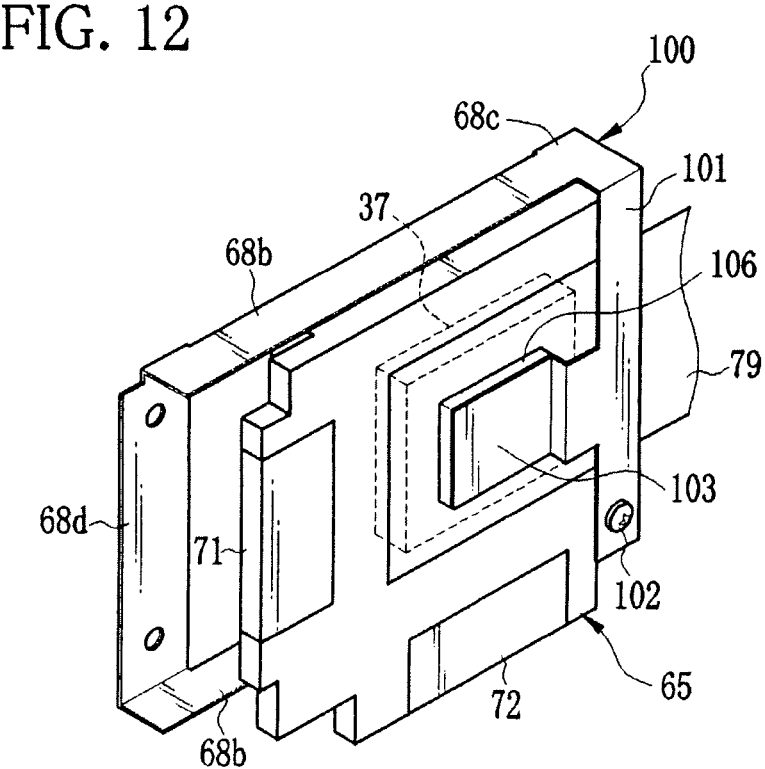
FIG. 12 is a rear perspective view of the first sheet metal member having a heat transfer plate disposed between the retainer and a CCD.

The conventional CCD shift type of image stabilizer cannot have a heat sink for reduction in weight of the CCD and the CCD holder. In this embodiment, however, as shown in FIG. 12, a heat transfer plate 106 that is made of a material with high thermal conductivity is attached on a front face of the retainer 103. Thus, the heat transfer plate 106 and the first sheet metal member 100 dissipate heat generated by the CCD 37. Only adding the heat transfer plate 106 does not cause significant increase in the weight of the CCD 37 and the CCD holder 65.

In the first and third embodiments, the lower side of the second sheet metal member is fixed to the base block, and the upper side shifts in the X-axis direction. However, the upper side of the second sheet metal member may be fixed and the lower side may be movable instead. The voice coil motors of moving coil type, in which coils are attached to a movable element, are used in the foregoing embodiments, but voice coil motors of moving magnet type, in which magnets are attached to the movable element, are available instead. In this case, the magnets are fixed to the CCD holder 65, and the coils are disposed in front of the magnets. The digital still camera 10 is taken as an example of an optical instrument, but the image stabilizer of the present invention is applicable to other various types of optical instruments including a silver halide camera and a telescope.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image stabilizer used in an optical instrument, comprising:
   a base block fixed to the optical instrument;
   an optical element holder for holding an optical element disposed on an optical axis of the optical instrument;
   an intermediate member disposed outside the optical element holder;
   a rectangular frame-shaped first sheet metal member fixed to the optical element holder and the intermediate member, for having a pair of first leaf springs that is formed by bending opposed two sides of the first sheet metal member in parallel with the optical axis and in parallel with each other, the pair of first leaf springs being elastically deformable in a first direction in a plane orthogonal to the optical axis;
   a rectangular frame-shaped second sheet metal member fixed to the intermediate member and the base block, for having a pair of second leaf springs that is formed by bending opposed two sides of the second sheet metal member in parallel with the optical axis and in parallel with each other, the pair of second leaf springs being elastically deformable in a second direction transverse to the first direction in the plane orthogonal to the optical axis; and
   an actuator for shifting the optical element through the optical element holder, while bending the first leaf springs or the second leaf springs, to counteract a shake in the first direction or the second direction,
   wherein the first sheet metal member, the second sheet metal member, and the intermediate member are integrally formed into an integrated sheet metal member by bending a single sheet of metal.

2. The image stabilizer according to claim 1, wherein a reinforcing plate is attached to the integrated sheet metal member.

* * * * *